US011748072B2

(12) United States Patent
Cappello et al.

(10) Patent No.: US 11,748,072 B2
(45) Date of Patent: Sep. 5, 2023

(54) APPARATUS AND METHOD FOR SOURCE CODE OPTIMISATION

(71) Applicant: Sony Interactive Entertainment Inc., Tokyo (JP)

(72) Inventors: Fabio Cappello, London (GB); Gregory James Bedwell, London (GB); Daryl Cooper, San Jose, CA (US); Timothy Edward Bradley, London (GB); Guy Moss, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 163 days.

(21) Appl. No.: 17/114,543

(22) Filed: Dec. 8, 2020

(65) Prior Publication Data

US 2021/0182039 A1 Jun. 17, 2021

(30) Foreign Application Priority Data

Dec. 12, 2019 (GB) ..................................... 1918265

(51) Int. Cl.
*G06F 8/41* (2018.01)
*G06N 20/00* (2019.01)
(Continued)

(52) U.S. Cl.
CPC ............... *G06F 8/443* (2013.01); *G06F 8/30* (2013.01); *G06F 8/4441* (2013.01);
(Continued)

(58) Field of Classification Search
CPC .......... G06F 8/30; G06F 8/443; G06F 8/4441; G06F 11/302; G06F 11/3447; G06N 20/00; G06N 5/04
See application file for complete search history.

(56) References Cited

U.S. PATENT DOCUMENTS

| 10,768,929 | B1* | 9/2020 | Turner ...................... G06F 8/38 |
| 2006/0101440 | A1* | 5/2006 | Stay ....................... G06F 8/4441 |
| | | | 717/151 |

(Continued)

FOREIGN PATENT DOCUMENTS

| EP | 3835944 A1 | 6/2021 |
| GB | 2586981 A | 3/2021 |

OTHER PUBLICATIONS

Extended European Search Report for corresponding Application EP20208488.5, 8 pages, dated May 6, 2021.

(Continued)

*Primary Examiner* — Ziaul A Chowdhury
(74) *Attorney, Agent, or Firm* — Matthew B. Dernier, Esq.

(57) ABSTRACT

A data processing apparatus adapted to output recommendation information for modifying source code, includes: compiler circuitry to compile the source code and to output compiled code for the source code, processing circuitry to execute the compiled code, profile circuitry to monitor the execution of the compiled code by the processing circuitry and to generate profile information for the execution of the compiled code, the profile information including one or more statistical properties for the execution of the compiled code, and recommendation circuitry to output the recommendation information for the source code, the recommendation circuitry including a machine learning model to receive at least a portion of the profile information and trained to output the recommendation information for the source code in dependence upon one or more of the statistical properties, in which the recommendation information is indicative of one or more editing instructions for modifying the source code.

14 Claims, 5 Drawing Sheets

(51) Int. Cl.
*G06F 8/30* (2018.01)
*G06F 11/30* (2006.01)
*G06F 11/34* (2006.01)
*G06N 5/04* (2023.01)

(52) U.S. Cl.
CPC ........ *G06F 11/302* (2013.01); *G06F 11/3447* (2013.01); *G06N 5/04* (2013.01); *G06N 20/00* (2019.01)

(56) References Cited

U.S. PATENT DOCUMENTS

| | | | |
|---|---|---|---|
| 2014/0047215 A1* | 2/2014 | Ogasawara | G06F 9/30079 712/205 |
| 2015/0186253 A1 | 7/2015 | Abraham | |
| 2016/0078347 A1* | 3/2016 | Salajegheh | G06F 11/3017 706/12 |
| 2016/0357655 A1* | 12/2016 | Mukai | G06F 11/302 |
| 2019/0317737 A1* | 10/2019 | Metsch | G06F 8/70 |

OTHER PUBLICATIONS

Examination Report for corresponding Application GB 1918265.8, 4 pages, dated Jan. 17, 2022.
Zheng Wang, et al., "Machine Learning in Compiler Optimisation" Proceedings of the IEEE, vol. 106, NR11, 22 pages, May 10, 2018.
Combined Search and Examination Report for corresponding Application GB1918265.8, 9 pages, dated Sep. 17, 2020.
Bunel et al., "Learning to Superoptimize Programs" 1st. Workshop on Neural Abstract Machines & Program Induction (NAMPI), 10 Pages, dated Dec. 4, 2016.
Communication Pursuant to Article 94(3) for corresponding Application 20208488.5, 6 pages, dated Mar. 14, 2022.

* cited by examiner

APPARATUS AND METHOD FOR SOURCE CODE OPTIMISATION

BACKGROUND OF THE INVENTION

Field of the Invention

The present disclosure relates to an apparatus and method for assisting in software development. In particular, the present disclosure relates to use of machine learning to identify one or more source code optimisations that can be applied to a source code to improve processing performance when a compiled code resulting from the source code is executed by a processing device.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Various software development tools exist for use during software development to allow developers to create and edit source code. Typically, software development tools include an editor that allows a software developer to create new source code or modify existing source code, and a compiler for compiling the source code that has been created or modified by the developer. Some editors may include features such as automatic keyword highlighting, parenthesis matching or syntax checking, for example, to assist the developer during program code development. The created or modified source code is then compiled by the compiler and an assembler generates program code for the source code.

Many different software development tools include debugger support for reporting errors in source code. For example, some software development tools may include a debugging tool that indicates a presence of an error in the source code for assisting the user in identifying and removing bugs from their source code to allow compilation of the source code by a compiler to generate compiled code. However, debugging tools typically generate debugging information when the source code is compiled to indicate one or more errors in the source code that prevent or hinder compilation.

Modification of source code by a developer to attempt to improve system performance when a processing system executes compiled code resulting from compilation of the source code can often be a counter-intuitive process in which a source code modification expected by the developer to result in improved system performance may in fact result in little change, no change or an adverse change in system performance.

Some code development tools may employ compiler algorithms for optimising the program code, object code or other compiled code that results from the compilation of the source code. However, such compiler algorithms are designed to optimise the program code or object code itself without modifying the source code, and such compiler algorithms are generally automated and performed for a certain target architecture. Therefore, even though a compiler algorithm can allow optimisation of the compiled code, the corresponding source code is unchanged and the compiler algorithm may repeatedly perform the same optimisations each time the source code is compiled resulting in additional processing time each time the compiled code is optimised.

It is therefore desirable to assist a developer when creating or editing source code to improve optimisation of source code. In particular, it is desirable to assist a developer when editing source code by indicating to the developer possible optimisations at the source code level for optimisation of source code to allow faster execution and more efficient use of memory or other system resources.

It is in this context that the present invention arises.

SUMMARY OF THE INVENTION

An example embodiment provides a data processing apparatus adapted to output recommendation information for modifying source code, comprising:
    compiler circuitry to compile the source code and to output compiled code for the source code;
    processing circuitry to execute the compiled code;
    profile circuitry to monitor the execution of the compiled code by the processing circuitry and to generate profile information for the execution of the compiled code, the profile information comprising one or more statistical properties for the execution of the compiled code; and
    recommendation circuitry to output the recommendation information for the source code, the recommendation circuitry comprising a machine learning model to receive at least a portion of the profile information and trained to output the recommendation information for the source code in dependence upon one or more of the statistical properties, in which the recommendation information is indicative of one or more editing instructions for modifying the source code.

Another example embodiment provides a method of outputting recommendation information for modifying source code, comprising:
    compiling the source code and outputting compiled code for the source code;
    executing the compiled code;
    monitoring the execution of the compiled code;
    generating profile information for the execution of the compiled code, the profile information comprising one or more statistical properties for the execution of the compiled code;
    receiving, by a machine learning model trained to output the recommendation information for the source code in dependence upon one or more of the statistical properties, at least a portion of the profile information; and
    outputting the recommendation information for the source code, the recommendation information comprising one or more editing instructions for modifying the source code.

Example embodiments provide computer software which, when executed by a computer, causes the computer to perform the steps of the method defined above.

Example embodiments provide a machine-readable, non-transitory storage medium which stores such computer software.

It is to be understood that both the foregoing general description of the invention and the following detailed description are exemplary, but are not restrictive, of the invention.

Various other aspects and features of the present disclosure are defined in the appended claims and within the text of the accompanying description.

BRIEF DESCRIPTION OF THE DRAWINGS

A more complete appreciation of the disclosure and many of the attendant advantages thereof will be readily obtained as the same becomes better understood by reference to the following detailed description of embodiments, when considered in connection with the accompanying drawings, in which.

DESCRIPTION OF THE EMBODIMENTS

An apparatus and method for assisting in software development are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
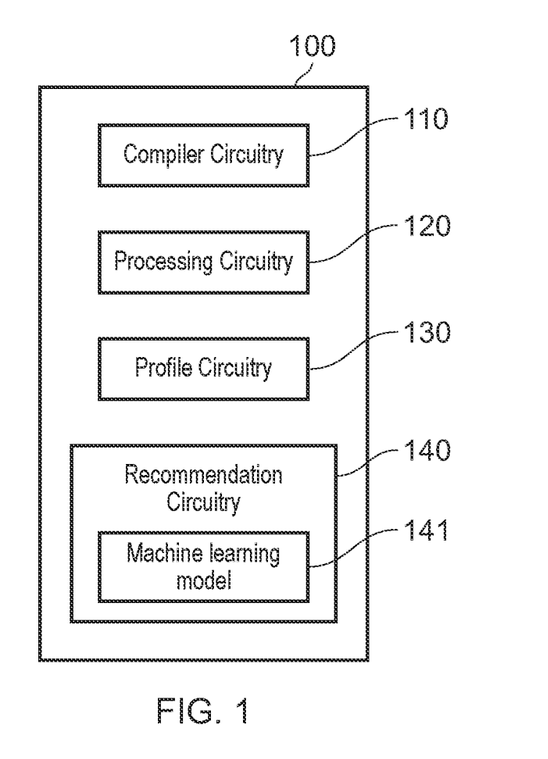
FIG. 1 is a schematic diagram illustrating a data processing apparatus adapted to output recommendation information for modifying source code.

Referring now to the drawings, wherein like reference numerals designate identical or corresponding parts throughout the several views, FIG. 1 schematically illustrates a data processing apparatus 100 adapted to output recommendation information for modifying source code. In embodiments of the disclosure the data processing apparatus 100 comprises: compiler circuitry 110 to compile the source code and to output compiled code for the source code; processing circuitry 120 to execute the compiled code; profile circuitry 130 to monitor the execution of the compiled code by the processing circuitry 120 and to generate profile information for the execution of the compiled code, the profile information comprising one or more statistical properties for the execution of the compiled code; and recommendation circuitry 140 to output the recommendation information for the source code, the recommendation circuitry comprising a machine learning model 141 to receive at least a portion of the profile information and trained to output the recommendation information for the source code in dependence upon one or more of the statistical properties, in which the recommendation information is indicative of one or more editing instructions for modifying the source code.

The data processing apparatus 100 may be provided as part of a general purpose computing device, such as a personal computer or a smartphone for example. In some examples, the data processing apparatus 100 may be provided as part of a remote server configured to communicate with a user's computing device via a wireless communication and data indicative of a source code can be received by the data processing apparatus 100 via the wireless communication.

The compiler circuitry 110 is configured to acquire a source code. The source code may be acquired directly from an editor that allows a software developer to create new source code or modify existing source code. In this way, a software developer can create new source mode or modify existing source code and created or modified source code from the editor can be provided to the compiler circuitry 110 for compilation to generate compiled code for the created or modified source code. In some examples, source code may be created or modified using an editor and then stored using a memory (not shown in FIG. 1). In this case, the compiler circuitry 110 can be configured to acquire a source code from the memory, in which the memory is configured to store one or more respective source codes. For example, a plurality of respective source codes may be stored by the memory as respective files and a respective file corresponding to a respective source code may be acquired by the compiler circuitry 110. In some examples, the data processing apparatus 100 comprises user input circuitry (not shown in FIG. 1) configured to receive a user input indicative of a selection of a given source code, and the compiler circuitry 110 is configured to acquire the given source code in response to the user input received by the input circuitry and to compile the given source code. In this way, a user can select a given source code that is to be compiled by the compiler circuitry 110.

Source code, also referred to as code, comprises a set of instructions and statements written by a programmer using a computer programming language. Typically, source code is written using a human-readable programming language (e.g. JavaScript, Python, C etc.) and comprises one or more declarations, instructions, functions, loops and other statements for instructing execution of a computer program. A given instance of source code may comprise respective portions of text that each allow a processing element to accomplish a specific task. These portions of text may be referred to as functions and a given function may be called one or more times for a given instance of source code. The source code for a given computer program may be created using a text editor and then saved as a file for storage by the memory.

The compiler circuitry 110 is configured to compile source code and to output compiled code for the source code. The compiled code output by the compiler circuitry 110 may be object code or an object file or program code generated based on the source code. The compiled code comprises a set of computer readable instructions that can be interpreted by a processing device. The compiled code may then be stored by the memory for execution by the processing circuitry 120 at a later time. Alternatively, source code may be compiled by the compiler circuitry 110 and once compiled the compiled code may be executed by the processing circuitry 120.

The processing circuitry 120 comprises one or more central processing units (CPUs) for executing the compiled code by performing mathematical, logical and decision operations. Each instruction causes the processing circuitry 120 to perform a task such as a load, a store, a jump or an arithmetic operation using data stored at a memory address in a memory or a register of a processing unit. In addition, the data processing apparatus 100 may comprise one or more memories accessible by the one or more CPUs.

The profile circuitry 130 is configured to monitor the execution of the compiled code by the processing circuitry 120 and to generate profile information for the execution of the compiled code, the profile information comprising one or more statistical properties for the execution of the compiled code. The profile circuitry 130 may use one or more software tracing tools using one or more performance counters to obtain performance information for the compiled code whilst the compiled code is executed by the processing circuitry 130. Profile information indicative of the execution behaviour of the compiled code can thus be generated by the profile circuitry 130. The profile circuitry 130 can be configured to analyse the execution of the compiled code by the processing circuitry 120 and to detect properties, such as occurrences of calls to different types of functions and sequences of calls to respective functions, associated with the execution of the compiled code so as to generate data comprising one or more statistics for the detected properties. For example, the profile circuitry 130 can be configured to count the number of calls to a given type of function, trace the hierarchies of the respective function calls and/or trace a sequence of the respective function calls. In this way, the profile circuitry 130 can detect what portion of code is called, when the portion of code is called, and the route and the order (scheduling) in which the respective portions of code are called. Therefore, the profile circuitry 130 allows monitoring of the performance for the execution of the compiled code. In some examples, the profile circuitry 130 may use an allocation profile tool to detect memory accesses for the compiled code and to trace memory usage during the execution. In some examples, the profile circuitry 130 may use a coverage profile tool to detect whether a portion of source code is executed and if so, a number of times that the portion of source code is executed. Hence more generally, the profile circuitry 130 is configured to monitor a state of the execution of the compiled code by the processing circuitry 120 and output profile information comprising statistics for the compiled code indicative of execution behaviour for the compiled code. The profile circuitry 130 thus allows profile information indicative of code performance to be collected for the execution of the compiled code to provide a record of the execution of the compiled code.

The profile information comprises one or more statistical properties for the execution of the compiled code. One statistical property may be indicative of a total number of calls to a first type of function. Another statistical property may be indicative of a total number of calls to a second type of function. Another statistical property may be indicative of a frequency associated with the calls to a given type of function. Another statistical property may be indicative of a total period of time taken on average to complete a call to a given type of function. Another statistical property may be indicative of a total number of memory accesses performed for the execution of the compiled code. Another statistical property may be indicative of a total number of memory accesses to a given memory region for the execution of the compiled code. Another statistical property may be indicative of a total number of occurrences of a given sequence of respective function calls. An example of a type of function may be a call to query a system clock. A common practice amongst developers of source code for computer games, for example, is to use the "get_time" system call to query the system clock to return a time and a date. This system call may be used for many different purposes including animation, scripting and game triggers among others, and may therefore be frequently used. In some cases, the "get_time" system call may be called thousands of times every second. Further details of the statistical properties obtained for the execution of the compiled code will be described later.

The recommendation circuitry 140 is configured to output the recommendation information for the source code, the recommendation circuitry 140 comprising the machine learning model 141. The machine learning model 141 is configured to receive at least a portion of the profile information generated by the profile circuitry 130 and the machine learning model 141 is trained to output the recommendation information in dependence upon one or more of the statistical properties, in which the recommendation information is indicative of one or more editing instructions for modifying the source code. In this way, profile information is firstly generated for the execution of the compiled code resulting from the source code, and the profile information is provided as an input to the machine learning model 141. The machine learning model 141 is trained to output the recommendation data in dependence upon the profile information corresponding to the source code, so as to provide one or more source code recommendations to a user for informing the user of possible source code adaptations to be applied to the source code and/or informing the user of one or more portions of the source code which for which modification has an effect on processing performance when the compiled code is executed. In particular, the one or more editing instructions may each correspond to a source code modification that if implemented will change the performance of a processing device, when the modified source code is compiled and the compiled code is executed by the processing device, in a manner that improves processing performance.

Consequently, recommendation information can be provided by the machine learning model 141 for suggesting one or more ways in which the source code can be adapted. Modifying the source code according to at least one of the one or more editing instructions results in modified source code for which the resulting compiled code has corresponding profile information that is different to the profile information obtained for the unmodified source code (initial source code). Specifically, the machine learning model 141 is trained to output recommendation information for modifying the source code in one or more ways that cause the profile information for the source code to be changed, and the change in the profile information achieved by an editing instruction is correlated with an improvement in one or more computer performance metrics. Therefore, a developer can create or modify their source code using a text editor, compile and execute compiled code and based on the profile information generated for the executed compiled code, the developer can then be provided with recommendation information indicative one or more editing instructions suggesting elements in the source code for which modification will result in improved processing performance and/or suggesting ways in which the source code can be adapted to optimise system performance when the source code is subsequently compiled again and resulting compiled code is executed. The recommendation information output by the machine learning model 141 may comprise values or ID numbers or other similar indicators. A given sequence of values output by the machine learning model 141 is indicative of at least one given editing instruction. For example, the information output by the machine learning model 141 may comprise a given value sequence and using a look-up table this value sequence can be mapped to a given editing instruction. In some examples, a given value sequence output by the machine learning model 141 may be mapped to one or more editing instructions, so that one or more possible source code modifications can be suggested for a given value sequence. In this way, recommendation information output by the machine learning model 141 can be mapped to one or more editing instructions which may correspond to a body of text suggesting to a user a way in which the source code can be modified. References herein to the machine learning model 141 outputting one or more editing instruction are to be understood as referring to the machine learning model 141 outputting at least one sequence of values that is indicative of one or more editing instructions for suggesting elements in a source code for modification. In some examples, at least one of the one or more editing instructions may take the form of a body of text indicating a name of a function or an identification number (ID) for a function used in the source code that can be adapted to improve processing performance. Therefore, one or more editing instructions may indicate a function included in the source code that if altered will change processing performance when compiled code is executed. In this way, a developer can be informed of certain portions of their source code that if adapted will influence processing performance for the execution of the compiled code. This can allow a developer to readily identify portions of source code which are worthwhile in investigating further during source code development to assist the developer in optimising their source code. Alternatively or in addition, the one or more editing instructions may directly indicate to the developer how to modify the source code by specifically indicating how to change a certain function included in the source code. In this way, a developer's time can be directed towards attempting to optimise portions of source code that are indicated by the machine learning model 141 as having an effect on processing performance when compiled code is executed. Certain portions of the source code may result in bottlenecks that occur when the compiled code is executed and the relationship between portions of the source code and the bottlenecks which occur during execution can be difficult for a developer to understand and in some cases counterintuitive. The recommendation information can therefore assist a developer during development of source code.

In embodiments of the disclosure, the profile circuitry 130 is configured to detect, for the execution of the compiled code, a type of function associated with a call to a function and a time associated with the call to the function and to generate the profile information to comprise at least one statistical property for the type of function. During the execution of the compiled code by the processing circuitry 120, calls may be issued to various types of functions specified by the source code in order to perform tasks such as returning values, handling registers, storing local variables and/or passing parameters. For example, "get_time" and "get_system_data" are two different types of system call which can be called in order to query a system clock to return a time and a date or to query a system table to return a value, respectively. The profile circuitry 130 detects calls to respective types of functions and creates the profile information indicating when the function is called and how many times the function is called during the execution of the compiled code. For example, the profile circuitry 130 can assign a timestamp to a detected call so as to indicate a time associated with the occurrence of the call to the function. The profile information can be created to indicate a number of statistical properties associated with the calls to a respective type of function.

In embodiments of the disclosure, the profile circuitry 130 is configured to detect a location of a memory access for the execution of the compiled code. During the execution of the compiled code by the processing circuitry 120, a number of read/write operations are performed for accessing memory locations. For a function that allows a read/write operation to be performed, the profile circuitry 130 can detect an address of a memory access associated with the function. In this way, the profile circuitry 130 can perform memory access tracing and generate profile information comprising statistics for the memory accesses to provide a record for the memory accesses. The profile information can therefore be generated to comprise one or more statistical properties for the memory accesses for the execution of the compiled code.

In particular, the profile information may comprise one or more statistical properties indicative of the number of accesses to one or more memory regions and/or one or more statistical properties indicative of a frequency of the accesses to one or more memory regions. In this way, one or more memory regions accessed with a high frequency when the compiled code is executed can be indicated by the profile information.

In embodiments of the disclosure, the profile information comprises one or more statistical properties, the one or more statistical properties comprising one or more from the list consisting of: a total number of calls for a type of function; a frequency associated with the calls for the type of function; an average duration associated with the calls for the type of function; and a total number of memory accesses for a given memory region. For each type of function detected by the profile circuitry 130, the profile circuitry 130 can generate the profile information to include a statistical property indicating the number of times that the type of function was called for the execution of the compiled code. For example, for the function "get_time" a first statistical property may indicate the number of calls to the function, a second statistical property may indicate a frequency for the calls to the function "get_time", a third statistical property may indicate an average period of time between the start time of the call to the function "get_time" and a time at which the called function ends. In this case, the average period of time may be calculated as the mean, median or mode. The profile information may comprise a statistical property indicative of the number of times a memory region is accessed. The forms of memory may include, for example, main memories, level 1 cache memories, level 2 cache memories, level 3 cache memories and buffer memories. A memory can be comprises a plurality of regions of physical address space each configured to support a data size for storing data. For each region of physical address space, the profile circuitry 130 can count a number of times that the region of physical address space is accessed.

In embodiments of the disclosure, the machine learning model 141 is trained to learn a correlation between a change in at least a first statistical property associated with the execution of the compiled code and a change in one or more computer performance metrics. The machine learning model 141 is trained using training data comprising profile information previously generated for an instance of source code and computer performance data indicative of one or more performance metrics for the computing system during execution of compiled code obtained by compiling the source code. The computer performance data is obtained during the execution to provide an indication of one or more performance criteria associated with the one or more central processing units (CPUs) and one or more memories accessed by the one or more CPUs. Using this training data, the machine learning model 141 can be trained for example using deep learning to learn a relationship between a change in the first statistical property for the profile information for the execution of the compiled code and a change in at least one computer performance metric. For example, the machine learning model 141 may be trained using a plurality of respective statistical properties associated with the profile information to learn whether or not a change in a given statistical property causes a change in any of the one or more computer performance metrics. Therefore, statistical properties included in the profile information which are of significance for processing system performance can be distinguished from statistical properties that are not of significance for processing system performance. For example, changes in the number of calls and/or the frequency of calls to a given type of function may have an effect on computer performance whereas changes in the number of calls and/or the frequency of calls to another type of function may have no effect on processing system performance. Therefore, statistical properties measured during the execution of the compiled code and included in the profile information which are of relevance to processing system performance can be learned.

The training data used for training the machine learning model 141 is described in more detail later. The training data is generated by a data processing apparatus such as that illustrated in FIG. 1 and further comprising computer performance circuitry (not shown in FIG. 1) configured to generate the computer performance data comprising data indicative of one or more computer performance metrics for the data processing apparatus 100 during execution of compiled code. It will be appreciated that FIG. 1 schematically illustrates a data processing apparatus 100 that generates profile information in response to execution of a compiled code by the processing circuitry 120, provides the profile information as an input to the trained machine learning model 141, and outputs recommendation information indicative of one or more possible source code modifications. The recommendation information is output on the basis of the profile information provided as an input to the machine learning model 141.

Figure 2:
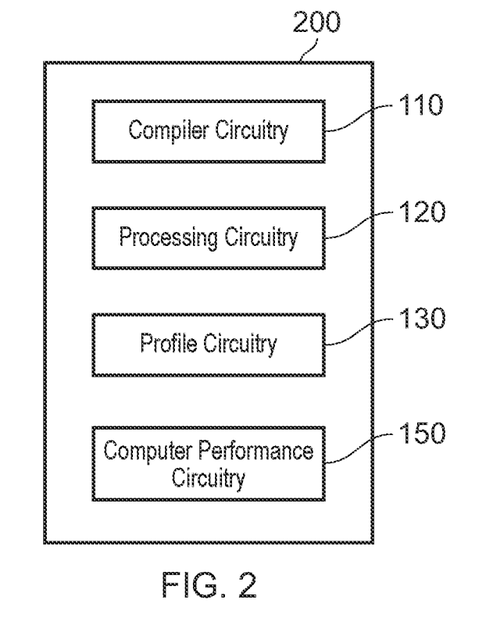
FIG. 2 is a schematic diagram illustrating a data processing apparatus adapted to output training data.

FIG. 2 schematically illustrates an example of a data processing apparatus 200 adapted to output training data, comprising: the compiler circuitry 110; the processing circuitry 120; the profile circuitry 130; and computer performance circuitry 150. The data processing apparatus 200 comprises the computer performance circuitry 150 for measuring one or more computer performance metrics for the execution in addition to the profile circuitry 130, so that training data comprising both the profile information and the computer performance data can be output by the data processing apparatus 200.

Assuming that a first statistical property included in the profile information associated with the execution of the compiled code is identified during training as having an effect on processing system performance (one or more of the computer performance metrics), at least one function for mapping an input to and output is learned by the machine learning model 141 for the first statistical property in order to map the profile information input to the machine learning model 141 to an output, the output corresponding to one or more editing instructions for modifying the source code to cause a change in the first statistical property. The change in the first statistical property caused by modifying the source code according to one of the editing instructions is correlated with a change in at least one of the computer performance metrics that corresponds to an improvement in computer performance. As such, one or more editing instructions that each cause a change in the first statistical property and that are each correlated with an improvement in processing performance of a computing system can be learned and an input provided to the machine learning model 141 can be mapped to an output comprising one or more of the editing instructions for changing the first statistical property to achieve the improvement in processing performance when the source code is modified according to at least one of the one or more editing instructions.

As discussed previously, the profile information generated by the profile circuitry 130 for the compiled code comprises one or more statistical properties and at least a portion of the profile information is received by the machine learning model 141. At least a first statistical property of the one or more statistical properties is provided to the machine learning model 141. For example, the first statistical property may be indicative of a total number of calls to a given type of function during the execution of the compiled code by the processing circuitry 120. The first statistical property can be provided to the machine learning model 141 and the machine learning model 141 is trained to output the recommendation information indicating one or more editing instructions for editing the source code for which the profile information was generated by the profile circuitry 130.

As such, by monitoring the performance of the compiled code when executed and providing statistics indicative of one or more code performance criteria to the machine learning model 141, recommendation information can be obtained for suggesting one or more portions for adaptation in the source code and/or one or more ways in which the source code can be adapted so that modified source code modified according to at least one of the one or more editing instructions results in compiled code having corresponding profile data associated with improved processing system performance.

In embodiments of the disclosure, the machine learning model 141 is trained to output the recommendation information for the source code in dependence upon at least the first statistical property associated with the execution of the compiled code, the recommendation information indicating the one or more editing instructions for modifying the source code to provide a change in the first statistical property when modified source code obtained by modifying the source code in accordance with one or more of the editing instructions is compiled and compiled code corresponding to the modified source code is executed by the processing circuitry.

In embodiments of the disclosure, each of the one or more editing instructions corresponds to a source code modification for the source code for providing modified source code resulting in a change in at least the first statistical property and a change in at least one of the one or more computer performance metrics. Each of the one or more editing instructions indicated by the recommendation information comprises data for a source code modification that when implemented for the source code will change the first statistical property in a manner that improves processing system performance. A source code modification may take the form of a body of text indicating to the developer a type of function present in the source code that is hindering processing performance or indicating to the developer a type of function present in the source code for which modification can result in improved processing performance.

Referring again to the example of the "get_time" system call, for the case where the profile information comprises the first statistical property indicative of the number of calls to the function "get_time", the machine learning model 141 outputs the recommendation information for which at least one editing instruction indicates to the user that an adaptation of the source code with respect to the function "get_time" will improve processing performance. Alternatively or in addition, at least one editing instruction may indicate to the user a manner in which the calls to the function "get_time" can be adapted in the source code to achieve an improvement in processing performance. For example, for the case where the profile information comprises the first statistical property and the first statistical property is indicative of the number of calls to the function "get_time", the machine learning model 141 can be trained to learn that a change in the first statistical property corresponding to a reduction in the number of calls to the function "get_time" can improve processing system performance and that one possible editing instruction for achieving this reduction is to reduce the number of times the function is called or to suggest using another function or statement in the source code instead. Consequently, in this case the machine learning model 141 can be trained to output recommendation information indicating one editing instruction for indicating to the user that a modification associated with the function "get_time" can result in improved processing performance. Alternatively or in addition, the machine learning model 141 can be trained to output recommendation information indicating one editing instruction for indicating to the user that a reduction in the number of calls the function "get_time" will result in improved processing performance. Alternatively or in addition, the machine learning model 141 can be trained to output recommendation information indicating one editing instruction for indicating to the user that at least some of the calls to the function "get_time" can be replaced with calls to another function and indicate to the user a name or an ID for the another function. For example, the machine learning model 141 can be trained to output recommendation information indicating one editing instruction for indicating to the user that at least some instances of "get_time" in the source code can be replaced with a call to a timing instruction (e.g. "rdtsc" on x64 platforms) and/or one editing instruction for indicating to the user that at least some instances of "get_time" in the source code can be replaced with an accessor to a cached value. This provides an example of one or more editing instructions for indicating to the user one or more ways for performing a source code modification associated with the function "get_time" that can result in improved processing performance. These source code modifications are examples of editing instructions that improve system performance that can be learned by the machine learning model 141 using the training data generated for respective instances of source code. Using this timing instruction instead of the call to the function "get_time" allows timing information to be obtained much more quickly than using the function "get_time". Similarly, by replacing some instances of "get_time" with an accessor to a cached value, "get_time" can be called less frequently (e.g. once per frame) thereby improving processing performance when source code modified in this way is executed. In this way, when profile information including the first statistical property is provided to the machine learning model 141, one or more editing instructions can be acquired on the basis of the recommendation information which indicate to the user that the source code can be modified in at least one of the following ways: i) reducing the number of calls to the function "get_time", ii) replacing at least some of the calls to the function "get_time" with a call to a timing instruction, and iii) replacing at least some of the calls to the function "get_time" with an accessor to a cached value. Whilst the above description provides an example with respect to the "get_time" function, the machine learning model 141 can be trained in a similar manner for other types of functions present in the instances of source code included in the training data. In this case, the editing instruction i) is an example of an editing instruction indicating a portion of the source code for which modification can result in improved processing performance without specifically indicating how the source code is to be modified, whereas options ii) and iii) are examples of editing instructions indicating to a developer how to modify the source code. Editing instructions ii) and iii) may be learned using the training data and are examples of editing instructions indicating to a developer how to modify the source code in a way that other instances of source code included in the training data were previously modified to achieve improvement in processing system performance.

In embodiments of the disclosure, the one or more editing instructions for modifying the source code are ranked according to a priority order. The recommendation circuitry 140 can be configured to output a plurality of editing instructions for modifying the source code and the plurality of editing instructions can be ordered with respect to each other according to a priority associated with each one or more of the plurality of editing instructions so that editing instructions that are most relevant are ranked above editing instructions that are least relevant. In some examples, a priority rating may be associated with each of the editing instructions in the recommendation information. Alternatively, a priority rating may be associated with one or more of the plurality of editing instructions in the recommendation information. For example, one or more editing instructions corresponding to a change in a first statistical property may each be assigned a priority rating and one or more editing instructions corresponding to a change in a second statistical property may have no priority rating. In this way, one or more editing instructions may be assigned a priority rating in dependence upon whether they relate to a change in a given statistical property, so that editing instructions for changing the given statistical property are assigned a priority rating and other editing instructions are not assigned a priority rating. Various criteria may be used for ordering the respective editing instructions with respect to each other to order the respective editing instructions according to their expected improvement in processing system performance.

In embodiments of the disclosure, an editing instruction for modifying the source code to provide a greater change in the first statistical property has a higher priority and an editing instruction for modifying the source code to provide a smaller change in first statistical property has a lower priority. An editing instruction for modifying the source code to provide a greatest change in the first statistical property has a highest priority and an editing instruction for modifying the source code to provide a smallest change in first statistical property has a lowest priority. The plurality of editing instructions may be assigned a priority rating so that for a given statistical property, an editing instruction providing a larger change in the given statistical property is assigned a higher priority rating than an editing instruction providing a smaller change in the given statistical property. For example, the recommendation data may comprise two or more editing instructions each indicating a different source code modification for changing the same statistical property. A first editing instruction may indicate a first source code modification and a second editing instruction may indicate a second source code modification. Depending upon the amount of change associated with each of the two or more editing instructions, the two or more editing instructions can be assigned a respective priority rating and ranked relative to each other so that an editing instruction for changing the given statistical property by a first amount is ranked higher than an editing instruction for changing the given statistical property by a second amount when the first amount is greater than the second amount, the change in the given statistical property corresponding to an improvement in processing performance. Referring again to the example of the "get_time" function in which the recommendation information comprises a plurality of editing instructions respectively indicating: i) reduce the number of calls to "get_time", ii) replace "get_time" with a call to a timing instruction, and iii) replace "get_time" with an accessor to a cache value. Since the editing instruction ii) for replacing "get_time" with a call to a timing instruction is associated with a greater change in the first statistical property compared to the editing instruction i) for reducing the number of calls to "get_time", a first priority rating is assigned to the editing instruction ii) and a second priority rating is assigned to the editing instruction i), in which the first priority rating has a higher priority than the second priority rating. Similarly, the editing instruction ii) for replacing "get_time" with a call to a timing instruction is associated with a greater change in the first statistical property compared to the editing instruction iii), because the editing instruction iii) still results in modified source code for which "get_time" is called more frequently (e.g. once per frame) than that for the editing instruction iii), and as such the editing instruction ii) is assigned a higher priority rating than the editing instruction iii).

In embodiments of the disclosure, the machine learning model 141 is trained to learn a correlation between a change in a second statistical property associated with the execution of the compiled code and a change in one or more of the computer performance metrics, and in which a first editing instruction for modifying the source code to provide a change in the first statistical property has a first priority and a second editing instruction for modifying the source code to provide a change in the second statistical property has a second priority different from the first priority. As discussed previously, the profile information comprises one or more statistical properties for the execution of the compiled code, and as such training data may be used to train the machine learning model 141 to learn a correlation between a change in a second statistical property associated with the execution of the compiled code and a change in one or more of the computer performance metrics in addition to learning a correlation for the first statistical property. The machine learning model 141 is trained to output, for received profile information comprising the first statistical property and the second statistical property, recommendation information comprising one or more first editing instructions for changing the first statistical property and one or more second editing instructions for changing the second statistical property. The one or more first editing instructions can be given a first priority rating and the one or more second editing instructions can be given a second priority rating, the first priority rating being either a higher or lower priority rating than the second priority rating. For example, during training the machine learning model 141 can learn the correlation between a change in a given statistical property and a change in one or more computer performance metrics, and as such it may be identified that changes in the one or more computer performance metrics are more sensitive to changes in a first statistical property compared to changes in a second statistical property (or vice versa). Therefore, editing instructions for modifying source code to change the first statistical property may be given a higher priority than editing instructions for modifying source code to change the second statistical property (or vice versa).

In embodiments of the disclosure, the change in at least one of the one or more computer performance metrics corresponds to an improvement in computer performance.

In embodiments of the disclosure, one of the one or more computer performance metrics corresponds to a period of time to execute the compiled code, and the change in the computer performance metric caused by modifying the source code in accordance with an editing instruction corresponds to a reduction in the period of time. The machine learning model 141 can be trained to learn a correlation between a change in at least the first statistical property and a change in a computer performance metric corresponding to a total amount of time to execute the compiled code. The recommendation information output by the machine learning model 141 includes the one or more editing instructions, in which each of the one or more editing instructions provides modified source code that changes the first statistical property in a way that is correlated with a change in the one or more computer performance metrics, and at least one of the one or more of the editing instructions provides modified source code that changes the computer performance metric corresponding to a total amount of time to execute the compiled code to reduce the period of time required to execute the compiled code. Hence more generally, one of the one or more computer performance metrics corresponds to a period of time taken to execute the compiled code, and the change in the first statistical property caused by an editing instruction corresponds to a reduction in the period of time.

In embodiments of the disclosure, the one or more computer performance metrics comprise one of more from the list consisting of: a period of time taken to execute the compiled code; a number of memory accesses for the execution of the compiled code; a number of cache misses for the execution of the compiled code; a processor time for each core used for the execution of the compiled code; and a usage percentage for each core used for the execution of the compiled code. As discussed previously, the data processing apparatus 100 may comprise computer performance circuitry 150 configured to generate the computer performance data comprising the one or more computer performance metrics. Various hardware components can be used for monitoring a performance level of a processing system by monitoring parameters associated with the CPU (central processing unit) and/or the memory associated with the CPU. The computer performance data comprises at least one computer performance metric indicative of the processing performance of the processing system and a change in the at least one computer performance metric corresponds to either a reduction in computer performance or an improvement in computer performance. During execution of the compiled code, a number of different parameters can be measured to provide an indication of processing performance. For example, a total time required to complete the execution of the compiled code may be measured by reading a clock value at that start time and end time of the execution. The total time taken may be calculated, for example, by taking a difference between the start time and the end time for the execution of the compiled code to obtain a value for the period of time required to execute the compiled code. As such, one statistical property may be indicative of the total time required to complete the execution of the compiled code. Alternatively or in addition, a memory access counter may be used to count a total number of memory accesses for the execution of the compiled code and/or to count a total number of memory accesses to a given region of physical memory space. For example, the memory may be segmented into respective regions of physical address space and a respective counter may be implemented for each region. Alternatively or in addition, a total number of cache misses associated with the execution of the compiled code may be measured. A cache miss occurs when data requested for processing is not found at the expected memory address and a delay in execution occurs due to the time required for fetching the data. The computer performance circuitry can be configured to detect a total number of cache misses for the execution of the compiled code and/or a total number of cache misses for a given region of physical memory space.

Alternatively or in addition, a processor time or CPU time indicative of the amount of time for which a CPU is used for performing processing operations during the time taken to execute the compiled code may be measured for a computer performance metric. Processor time is a measure of how much time a core of a processing unit spends processing data during the period of time taken to complete the execution of the compiled code and may be expressed as a ratio or a percentage of the total period of time required to execute the compiled code to provide a metric for processor activity. In this way, an indication of the amount of time spent on I/O operations and fetching and storing data compared to the amount of time spent processing data for the execution of the compiled code is provided. Alternatively or in addition, a CPU usage may be output indicating the CPU time as a percentage of the CPU's capacity. Alternatively or in addition, a usage percentage indicative of an amount of utilization for each core of the CPU used for the execution of the compiled code may be measured as one of the computer performance metrics.

In embodiments of the disclosure, the machine learning model 141 is trained using training data obtained for a plurality of source codes, in which for a given source code the training data comprises: profile information comprising a plurality of statistical properties for an execution of a compiled code obtained by compiling the given source code; and computer performance data indicative of one or more computer performance metrics for the execution of the compiled code. Training data is accumulated for a given source code by generating profile information for an execution of compiled code by a processing system and concurrently generating computer performance data indicative of one or more computer performance metrics for the processing system. The profile information and its corresponding computer performance data can be stored in association with each other for the given source code for use in training the machine learning model 141. In some examples, the data processing apparatus 100 further comprises computer performance circuitry (not shown in FIG. 1) configured to generate the computer performance data indicative of the one or more computer performance metrics for the processing circuitry 120 during execution of compiled code. An instance of source code may firstly be compiled to provide compiled code and both profile information and computer performance data can be generated for the execution of the compiled code and stored for use as training data.

Figure 3:
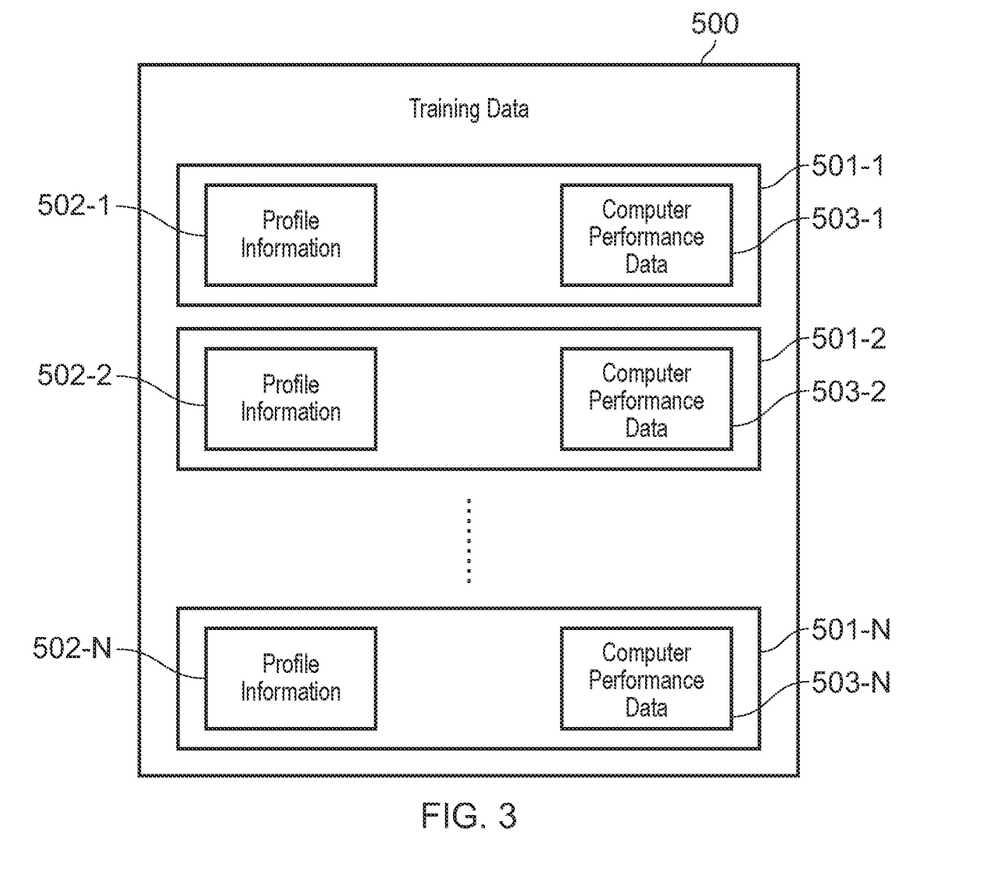
FIG. 3 is a schematic diagram illustrating an example of training data obtained for a plurality of source codes.

FIG. 3 schematically illustrates an example of training data 500 obtained for N source codes 501-1 . . . 501-N, in which for a given source code the training data comprises profile information 502 and corresponding computer performance data 503. The profile information 502-1 comprises a plurality of statistical properties for the execution of the compiled code obtained by compiling the source code 501-1 and the computer performance data 503-1 comprises a plurality of computer performance metrics measured during the execution of the of the compiled code. In some examples, the first source code 501-1 and second source code 501-2 may be created by the same user and the second source code 501-2 may represent a modified version of the first source code 501-1. In this case, many of the statements present in the first source code 501-1 may also be present in the second source code 501-2, and the set of statistical properties for the profile information 502-1 may share many similarities with the set of statistical properties for the profile information 502-2 (this is discussed in more detail in the following paragraph). Alternatively, the first source code 501-1, and therefore the first profile information 502-1 and first computer performance data 503-1, may be obtained from a first data processing apparatus 200 and the second source code 501-2, and therefore the second profile information 502-2, and second computer performance data 503-2, may be obtained from another data processing apparatus 200, where the first data processing apparatus and the another data processing apparatus are operated by different users. In this case, the first source code 501-1 may differ significantly from the second source code 501-2, such that the profile information 502-1 for the first source code 501-1 may comprise a first set of statistical properties and the profile information 502-2 for the second source code 501-2 may comprise a second set of statistical properties. For example, the first source code 501-1 may be developed for a first video game application and the second source code 501-2 may be developed for another video game application and one or more types of function may be common to both the first source code and the second source code and one or more types of function may be present in only one of the first source code and the second source code. Therefore, a range of different source codes used for different applications and including a range of different types of functions can be used to generate the training data.

The training data is formed by collecting profile information and corresponding computer performance data for a plurality of instances of source code. For example, a given developer may create or modify multiple instances of source code and for each instance of source code created or modified by the developer, when the compiled code is executed, the profile information and corresponding computer performance data can be acquired and stored as part of the training data for training the machine learning model 141. Training data can be collected in this way by gathering profile information and corresponding computer performance data from a plurality of users (developers). In this way, training data comprising profile information indicative of a plurality of statistical properties for the execution of the compiled code and computer performance data indicative of at least one computer performance metric can be used to train the machine learning model 141 to learn a correlation between a change in a given statistical property and a change in at least one of the computer performance metrics. For example, the machine learning model 141 may be trained using the training data for the plurality of instances of source code to learn which of the plurality of statistical properties are correlated with changes in one or more of the computer performance metrics, so that statistical properties included in the profile information which are of significance for processing system performance can be distinguished from statistical properties that are not of significance for processing system performance. Then, for a given statistical property for which a change in the statistical property causes a change in one or more of the computer performance metrics, the machine learning model 141 can be trained to learn a relationship between the change in the given statistical property and a change in one or more of the computer performance metrics, and therefore a change in the given statistical property that results in a change in one or more of the computer performance metrics that improves the performance of the processing system can be learned.

In embodiments of the disclosure, for a given source code the training data further comprises: second profile information comprising a plurality of statistical properties for an execution of second compiled code obtained by compiling a modified source code, the modified source code obtained by modifying the given source code; and second computer performance data indicative of the one or more computer performance metrics for the execution of the second compiled code. In addition to generating the profile information and corresponding computer performance data for a given instance of source code, second profile information and corresponding second computer performance data may be generated for a second version of the source code, in which the second version is a modified version of the first version of the source code. In other words, for a source code the training data may comprise: first profile information and corresponding first computer performance data generated for a first version of the source code; and second profile information and corresponding second computer performance data generated for a second version of the same source code. Therefore, first data can be generated for an initial version of a source code and second data can be generated for a second version of the source code, and the first data can be stored in association with the second data.

Figure 4:
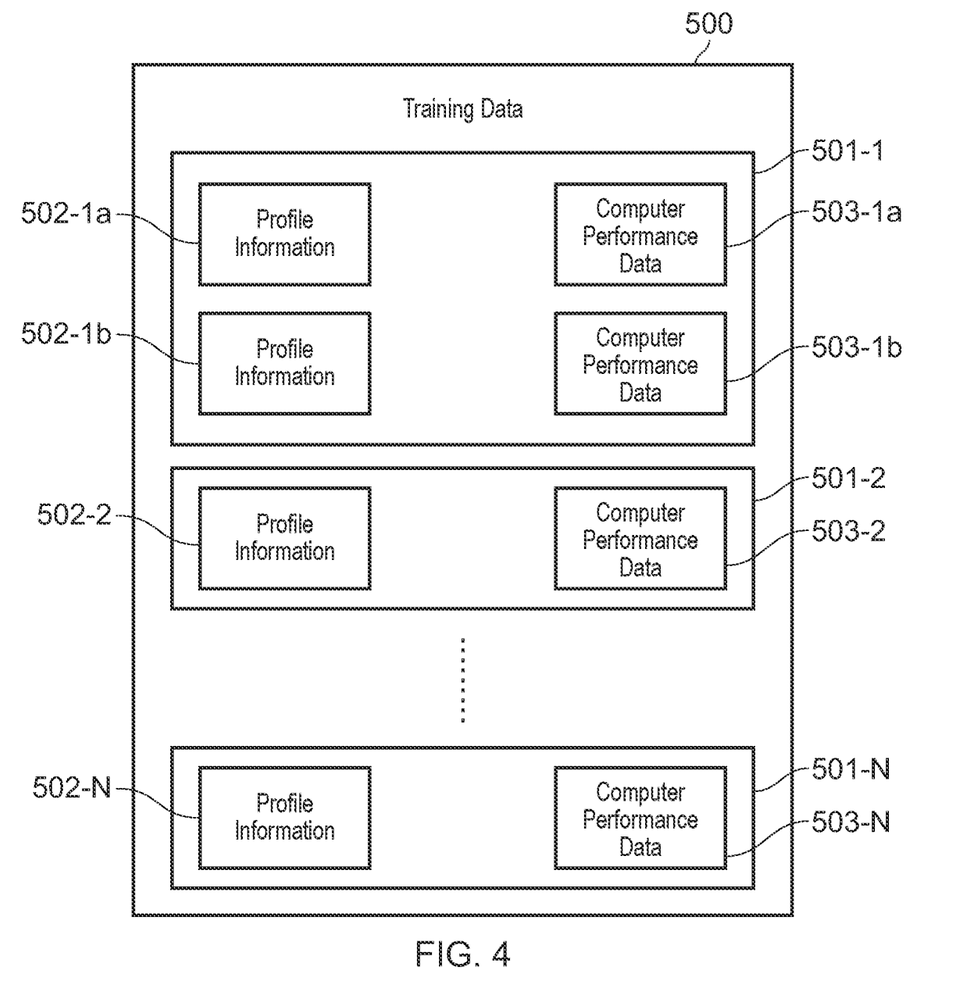
FIG. 4 is a schematic diagram illustrating an example of training data obtained for different versions of a source code.

FIG. 4 schematically illustrates an example of training data 500 obtained for N source codes 501-1 . . . 501-N, in which for a first source code 501-1 the training data comprises: first profile information 502-1a and corresponding first computer performance data 503-1a for an initial version of first source code 501-1; and second profile information 502-1b and corresponding second computer performance data 503-1b for a second version of first source code 501-1. The modification between the first version and the second version of the first source code 501-1 (e.g. the addition, removal or replacement of certain functions) will cause one or more of the statistical properties for the second profile information 502-1b to vary compared to the first profile information 502-1a and in addition will cause one or more of the computer performance metrics for the second computer performance data 503-1b to vary compared to the first computer performance data 503-1a. It will be appreciated that there may be multiple versions of the first source code 501-1 each differing from a prior version and profile information 502-1a, 1b . . . 1n and computer performance data 503-1a, 1b . . . 1n may be generated for the first source code 501-1. Changes in a given statistical property between the first profile information 502-1a and the second profile information 502-1b can be identified together with changes in one or more of the computer performance metrics between the first computer performance data 503-1a and the second computer performance data 503-1b and the machine learning model 141 can learn a correlation between a change in a given statistical property and a change in one or more computer performance metrics. Therefore, source code modifications implemented by a developer to modify a source code in a way that results in a change in both the profile information and the computer performance data can be identified, and the machine learning model 141 can be trained to learn which changes in profile information correlate with changes in the computer performance data cause improvement in processing performance to allow editing instructions for improving system performance to be appropriately suggested to developers when developing their source code.

For example, the first profile information 502-1a may comprise a first statistical property indicative of a number of calls to a first type of function, a second statistical property indicative of a frequency of calls to the first type of function, a third statistical property indicative of a number of calls to a second type of function and a fourth statistical property indicative of a frequency of calls to the second type of function. The second profile information 502-1b may also comprise the first, second, third and fourth statistical properties, and a value associated with one of more of the statistical properties may vary between the first profile information 502-1a and the second profile information 502-1b. For example, a value associated with the first statistical property may change between the first profile information 502-1a and the second profile information 502-1b whilst values associated with other statistical properties remain unchanged. At the same time, if one or more of the computer performance metrics change between the first computer performance data 503-1a and the second computer performance data 503-1b then the change in the first statistical property can be correlated with the change in the computer performance data. Consequently, the machine learning model 141 is trained to learn a relationship between a change in the profile information 502 and a change in the computer performance data 503 and one or more editing instructions that when implemented for a source code cause the change in the profile information 502 can be learned.

Figure 5:
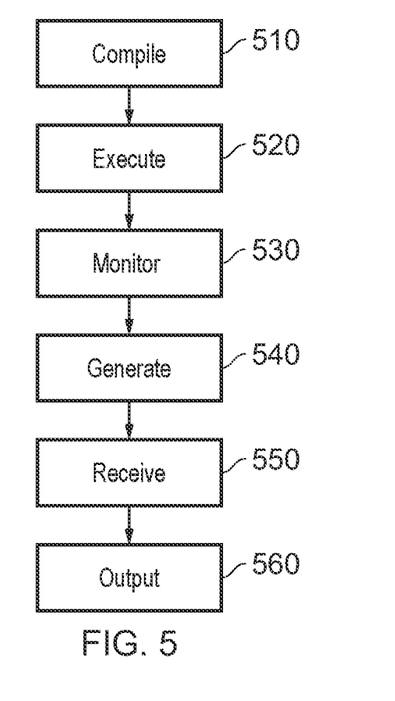
FIG. 5 is a schematic flowchart illustrating a method of outputting recommendation information for modifying source code.

Referring now to FIG. 5, in embodiments of the disclosure, a method of outputting recommendation information for modifying source code, comprises:

compiling (at a step 510) the source code and outputting compiled code for the source code;

executing (at a step 520) the compiled code;

monitoring (at a step 530) the execution of the compiled code;

generating (at a step 540) profile information for the execution of the compiled code, the profile information comprising one or more statistical properties for the execution of the compiled code;

receiving (at a step 550), by a machine learning model trained to output the recommendation information for the source code in dependence upon one or more of the statistical properties, at least a portion of the profile information; and outputting (at a step 560) the recommendation information for the source code, the recommendation information comprising one or more editing instructions for modifying the source code.

In embodiments of the disclosure, the training data 500 as described with reference to FIGS. 3 and 4 is obtained for a plurality of source codes, in which the computer performance data 503 is obtained using one or more performance counters for detecting occurrences of processing system errors for the execution of the compiled code. Processing system errors include errors associated with the CPU, the memory and other system resources, and comprise one or more from the list consisting of: a cache miss, a pipeline stall, and a branch misprediction. Cache misses may occur when data is not found in the cache memory and an additional period of time is required for fetching the data during the execution of the compiled code. A pipeline stall is a delay in execution that allows a hazard to be resolved prior to execution of an instruction. Branch predictors are used to predict a flow in a pipeline for allowing a predicted branch to be fetched and speculatively or partially executed. If however the prediction turns out to be wrong (a branch misprediction), then the speculatively or partially executed branch is discarded and a misprediction delay occurs. As such, the computer performance circuitry 150 may comprise one or more performance counters for detecting occurrences of processing system errors, and the computer performance data 503 indicative of processing errors (e.g. glitches in processing system performance) can be used for trainining the machine learning model 141.

Using this training data 500, the machine learning model 141 can be trained for example using deep learning to learn a correlation between the profile information 502 and occurrences of processing errors indicated by the computer performance data 503. For example, an error in system performance (e.g. a glitch) may be indicated by a high rate of change (e.g. a spike) in the data associated with one or more of the performance counters. The machine learning model 141 may be trained using a plurality of respective statistical properties associated with the profile information 502 to learn whether or not a change in a given statistical property is associated with a detection of a system processing error. Therefore, statistical properties included in the profile information 502 which are of significance for processing system errors can be distinguished from statistical properties that are not of significance for processing system errors. In this way, the machine learning model 141 can be trained to learn which statistical properties are correlated with processing system errors.

Using the machine learning model 141 trained for processing system errors in this way allows a given source code to be compiled and executed by the data processing apparatus 100. Then, at least a portion of the profile information generated for the execution of the compiled code is provided to the machine learning model 141, and the machine learning model 141 is trained to output the recommendation information indicating one or more editing instructions for modifying the source code in a way that improves processing system performance by reducing processing system errors. For example, the recommendation information may comprise one or more value sequences indicating one or more editing instructions for indicating to a user a way in which the source code can be modified to reduce processing system errors by indicating a type of function call suspected as causing the processing system errors.

This can allow aspects of source code causing processing system performance bottlenecks to be identified to a user using machine learning. Therefore, rather than using conventional software development kits that allow users to manually observe performance counters and identify glitches, which still requires the user to establish the cause of the glitch in their code, the execution of the compiled code by the processing circuitry 120 can be monitored by the profile circuitry 130 to generate the profile information and one or more source code modifications can be suggested to the user using the trained machine learning model 141. In this way, one or more editing instructions can be provided to indicate to the user possible source code modifications for reducing processing system errors without necessarily requiring the user to manually observe the performance counters for the execution of the compiled code.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of outputting recommendation information for modifying source code, comprising:
    compiling the source code and outputting compiled code for the source code;
    executing the compiled code;
    monitoring the execution of the compiled code;
    generating profile information for the execution of the compiled code, the profile information comprising one or more statistical properties for the execution of the compiled code;
    receiving, by a machine learning model trained to output the recommendation information for the source code in dependence upon one or more of the statistical properties, at least a portion of the profile information; and
    outputting the recommendation information for the source code, the recommendation information comprising one or more editing instructions for modifying the source code, wherein:
    the machine learning model is trained to learn a correlation between a change in at least a first statistical property associated with the execution of the compiled code and a change in one or more computer performance metrics,
    the one or more statistical properties for the execution of the compiled code comprises: a total number of calls for a type of function; a frequency associated with the calls for the type of function; an average duration associated with the calls for the type of function; and a total number of memory accesses for a given memory region,
    the machine learning model is trained, using training data comprising profile information previously generated for an instance of source code and computer performance data indicative of one or more performance metrics for the computing system during execution of compiled code obtained by compiling the source code, to learn, and
    the one or more computer performance metrics comprises: a period of time taken to execute the compiled code; a number of memory accesses for the execution of the compiled code; a number of cache misses for the execution of the compiled code; a processor time for each core used for the execution of the compiled code; and a usage percentage for each core used for the execution of the compiled code.

2. A data processing apparatus adapted to output recommendation information for modifying source code, comprising:
    compiler circuitry to compile the source code and to output compiled code for the source code;
    processing circuitry to execute the compiled code;
    profile circuitry to monitor the execution of the compiled code by the processing circuitry and to generate profile information for the execution of the compiled code, the profile information comprising one or more statistical properties for the execution of the compiled code; and
    recommendation circuitry to output the recommendation information for the source code, the recommendation circuitry comprising a machine learning model to receive at least a portion of the profile information and trained to output the recommendation information for the source code in dependence upon one or more of the statistical properties, in which the recommendation information is indicative of one or more editing instructions for modifying the source code, wherein:

the machine learning model is trained to learn a correlation between a change in at least a first statistical property associated with the execution of the compiled code and a change in one or more computer performance metrics, the one or more statistical properties for the execution of the compiled code comprises:

a total number of calls for a type of function; a frequency associated with the calls for the type of function; an average duration associated with the calls for the type of function; and a total number of memory accesses for a given memory region, the machine learning model is trained, using training data comprising profile information previously generated for an instance of source code and computer performance data indicative of one or more performance metrics for the computing system during execution of compiled code obtained by compiling the source code, to learn, and the one or more computer performance metrics comprises:

a period of time taken to execute the compiled code; a number of memory accesses for the execution of the compiled code; a number of cache misses for the execution of the compiled code; a processor time for each core used for the execution of the compiled code; and a usage percentage for each core used for the execution of the compiled code.

3. The data processing apparatus according to claim 2, in which the profile circuitry is configured to detect, for the execution of the compiled code, a type of function associated with a call to a function and a time associated with the call to the function.

4. The data processing apparatus according to claim 3, in which the profile circuitry is configured to detect a location of a memory access for the execution of the compiled code.

5. The data processing apparatus according to claim 2, in which the machine learning model is trained to output the recommendation information for the source code in dependence upon at least the first statistical property associated with the execution of the compiled code, the recommendation information indicating the one or more editing instructions for modifying the source code to provide a change in the first statistical property when modified source code obtained by modifying the source code in accordance with one or more of the editing instructions is compiled and compiled code corresponding to the modified source code is executed by the processing circuitry.

6. The data processing apparatus according to claim 2, in which the one or more editing instructions for modifying the source code are ranked according to a priority order.

7. The data processing apparatus according to claim 6, in which an editing instruction for modifying the source code to provide a greater change in the first statistical property has a higher priority and an editing instruction for modifying the source code to provide a smaller change in first statistic al property has a lower priority.

8. The data processing apparatus according to claim 6, in which the machine learning model is trained to learn a correlation between a change in a second statistical property associated with the execution of the compiled code and a change in one or more of the computer performance metrics, and in which a first editing instruction for modifying the source code to provide a change in the first statistical property has a first priority and a second editing instruction for modifying the source code to provide a change in the second statistical property has a second priority different from the first priority.

9. The data processing apparatus according to claim 2, in which each of the one or more editing instructions corresponds to a source code modification for the source code for providing modified source code resulting in a change in at least the first statistical property and a change in at least one of the one or more computer performance metrics.

10. The data processing apparatus according to claim 9, in which the change in at least one of the one or more computer performance metrics corresponds to an improvement in computer performance.

11. The data processing apparatus according to claim 9, in which one of the one or more computer performance metrics corresponds to a period of time to execute the compiled code, and the change in the computer performance metric corresponds to a reduction in the period of time.

12. The data processing apparatus according to claim 2, in which the machine learning model is trained using training data obtained for a plurality of source codes, in which for a given source code the training data comprises:

profile information comprising a plurality of statistical properties for an execution of compiled code obtained by compiling the given source code; and computer performance data indicative of one or more computer performance metrics for the execution of the compiled code.

13. The data processing apparatus according to claim 12, in which for the given source code the training data further comprises:

second profile information comprising a plurality of statistical properties for an execution of second compiled code obtained by compiling a modified source code, the modified source code obtained by modifying the given source code; and second computer performance data indicative of the one or more computer performance metrics for the execution of the second compiled code.

14. A non-transitory, computer readable storage medium containing computer software which, when executed by a computer, causes the computer to perform a method of outputting recommendation information for modifying source code, by carrying out actions, comprising:

compiling the source code and outputting compiled code for the source code;

executing the compiled code;

monitoring the execution of the compiled code;

generating profile information for the execution of the compiled code, the profile information comprising one or more statistical properties for the execution of the compiled code;

receiving, by a machine learning model trained to output the recommendation information for the source code in dependence upon one or more of the statistical properties, at least a portion of the profile information; and outputting the recommendation information for the source code, the recommendation information comprising one or more editing instructions for modifying the source code, wherein:

the machine learning model is trained to learn a correlation between a change in at least a first statistical property associated with the execution of the compiled code and a change in one or more computer performance metrics, the one or more statistical properties for the execution of the compiled code comprises: a total number of calls for a type of function; a frequency associated with the calls for the type of function; an average duration associated with the calls for the type of function; and a total number of memory accesses for a given memory region, the machine learning model is trained, using training data comprising profile information previously generated for an instance of source code and computer performance data indicative of one or more performance metrics for the computing system during execution of compiled code obtained by compiling the source code, to learn, and the one or more computer performance metrics comprises: a period of time taken to execute the compiled code; a number of memory accesses for the execution of the compiled code; a number of cache misses for the execution of the compiled code; a processor time for each core used for the execution of the compiled code; and a usage percentage for each core used for the execution of the compiled code.

* * * * *